(12) United States Patent
Lattman et al.

(10) Patent No.: US 9,965,751 B1
(45) Date of Patent: May 8, 2018

(54) MOBILE DEVICE MULTI-FEED SCANNER (71) Applicant: Capital One Services, LLC, McLean, VA (US)

(72) Inventors: Matthew Lattman, Washington, DC (US); Greg McAllister, San Rafael, CA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days. days.

(21) Appl. No.: 15/662,441

(22) Filed: Jul. 28, 2017

Related U.S. Application Data (60) Provisional application No. 62/440,190, filed on Dec. 29, 2016.

(51) Int. Cl.
| | |
|---|---|
| *H04N 1/04* | (2006.01) |
| *G06Q 20/10* | (2012.01) |
| *G07F 19/00* | (2006.01) |
| *F16M 11/04* | (2006.01) |
| *H04W 4/00* | (2018.01) |
| *F16M 11/18* | (2006.01) |

(52) U.S. Cl.
CPC ......... *G06Q 20/108* (2013.01); *F16M 11/046* (2013.01); *G07F 19/202* (2013.01); *F16M 11/18* (2013.01); *H04W 4/008* (2013.01)

(58) Field of Classification Search
CPC ........... H04N 2201/0094; H04N 1/193; H04N 1/00968; H04N 1/1013; H04N 1/12; H04N 2201/044; H04N 1/00018; H04N 1/107; G06F 3/1205; G06F 3/1256; G06F 3/1275; G06F 3/1285; G06F 21/608

USPC ...... 358/1.15, 474, 497, 448, 461, 496, 468, 358/488, 498, 486, 504; 709/203, 217, 709/220, 223, 224, 225; 399/366, 1, 108, 399/2, 200, 202, 27, 299, 360, 403, 44, 399/46, 61, 62, 67, 71, 74; 235/462.01, 235/462.14, 462.24, 462.25, 462.32, 235/462.38, 462.39; 382/100, 232, 274, 382/17

See application file for complete search history.

(56) References Cited

U.S. PATENT DOCUMENTS

| | | | | |
|---|---|---|---|---|
| 4,708,486 A | * | 11/1987 | Watanabe | .......... H04N 1/00681 358/296 |
| 5,149,950 A | * | 9/1992 | Swartz | ............... G06K 7/10633 235/462.07 |
| 5,378,883 A | * | 1/1995 | Batterman | .......... G06K 7/10881 235/455 |
| 5,526,076 A | * | 6/1996 | Walker | .................... G09F 19/16 353/43 |

(Continued)

*Primary Examiner* — Negussie Worku
(74) *Attorney, Agent, or Firm* — Hunton & Williams LLP (57) ABSTRACT

An imaging device provides a mobile device multi-feed scanner, which may utilize remote data capture for multi-sheet feed scanning by using mirrors to form a reflective path allowing the viewing of the reverse side of the check on a platform to capture the check image on a mobile device. A camera on the mobile device may either sequentially or simultaneously capture a picture of both the front and back sides of the check. The platform may include a transparent portion, which may be adjacent to a stage portion. The first and second mirrors may be positioned such as to allow imaging of a reverse side of an object through the transparent portion of the platform while the object rests on the stage portion.

14 Claims, 4 Drawing Sheets

(56) References Cited

U.S. PATENT DOCUMENTS

| | | | | |
|---|---|---|---|---|
| 6,151,464 | A * | 11/2000 | Nakamura | H04N 1/32122 |
| | | | | 399/79 |
| 6,512,539 | B1 * | 1/2003 | Dance | H04N 1/195 |
| | | | | 348/146 |
| 2002/0126326 | A1 * | 9/2002 | Hashizume | H04N 1/1013 |
| | | | | 358/509 |
| 2005/0128551 | A1 * | 6/2005 | Yang | G02B 6/0016 |
| | | | | 359/212.2 |
| 2006/0222405 | A1 * | 10/2006 | Iwasaki | F16D 1/0894 |
| | | | | 399/167 |
| 2007/0008570 | A1 * | 1/2007 | Okamoto | H04N 1/00278 |
| | | | | 358/1.14 |
| 2007/0211313 | A1 * | 9/2007 | Kurokawa | H04N 1/00538 |
| | | | | 358/498 |
| 2008/0029954 | A1 * | 2/2008 | Takiguchi | B65H 5/06 |
| | | | | 271/264 |
| 2008/0237978 | A1 * | 10/2008 | Kimura | B65H 1/14 |
| | | | | 271/264 |
| 2008/0252943 | A1 * | 10/2008 | Kozakura | H04N 1/00347 |
| | | | | 358/474 |
| 2009/0169241 | A1 * | 7/2009 | Mimura | G03G 15/0875 |
| | | | | 399/106 |
| 2010/0034565 | A1 * | 2/2010 | Ashikawa | G03G 15/0131 |
| | | | | 399/302 |
| 2011/0022088 | A1 * | 1/2011 | Forton | A61B 17/7086 |
| | | | | 606/246 |
| 2011/0043868 | A1 * | 2/2011 | Liao | H04N 1/0464 |
| | | | | 358/474 |

* cited by examiner

MOBILE DEVICE MULTI-FEED SCANNER

CROSS REFERENCE TO RELATED APPLICATION

The subject application claims the benefit of U.S. Provisional Patent Application No. 62/440,190, filed on Dec. 29, 2016, the contents of which are hereby incorporated by reference in their entireties.

FIELD OF THE DISCLOSURE

The present disclosure relates to a multi-feed scanner that utilizes a mobile-based remote data capture device.

BACKGROUND OF THE DISCLOSURE

Currently, most major financial institutions now offer mobile deposit services to their customers. The customer may take a picture of a check using his mobile device and a mobile banking application provided by his bank, and the bank completes the deposit based on information captured from the digital image of the check. Additionally, scanners may also be utilized to capture checks, where a customer, which may include an individual and/or a business may scan an image of a check using a scanner and a mobile banking application provided by a bank, and the bank completes the deposit based on information captured from the digital image of the check.

When capturing the image by taking a picture or by scanning a check, a customer may need to manually flip each check individually to capture both sides of the check. Also when utilizing a mobile device to capture the image of a high volume of checks, manually taking a picture of each check can be extremely time-consuming. If a scanner is used to capture multiple checks, a very specific multi-sheet scanner must be utilized requires a very different configuration than a standard mobile-based remote data capture scanner. Such a multi-sheet scanner must be configured separately and requires additional development time for the associated software, which may include specific development of remote data capture applications for each scanner configuration, This may be extremely time consuming and cost prohibitive for both individuals and smaller businesses.

These and other drawbacks exist.

SUMMARY OF THE DISCLOSURE

Various example embodiments provide a mobile device multi-feed scanner, which may utilize remote data capture for multi-sheet feed scanning by using mirrors to project the front and back sides of a check to capture the check image on a mobile device. The mobile device multi-feed scanner may include a platform, a base, an imaging tray, a frame, a motor, two mirrors, a connector, mechanized rollers, a feeder, and a capture tray. A user may place a stack of checks (or documents) on the feeder, and may place a mobile device on the imaging tray which is located above the platform which includes a transparent surface. A conveyor mechanism may roll a check from a stack of checks utilizing a mechanized feeder onto the platform. The two mirrors which may be angled under the transparent surface of the platform may allow imaging of the reflection of the back of the check through the platform. A camera on the mobile device may either sequentially or simultaneously capture a picture of both the front and back sides of the check.

BRIEF DESCRIPTION OF THE DRAWINGS

Various embodiments of the present disclosure, together with further objects and advantages, may best be understood by reference to the following description taken in conjunction with the accompanying drawings, in the several Figures of which like reference numerals identify like elements, and in which.

DETAILED DESCRIPTION OF THE EMBODIMENTS

The entire contents of the following application is incorporated herein by reference: U.S. patent application Ser. No. 14/977,845 entitled "Mobile Device Stand" filed Dec. 22, 2015, which claims the benefit of U.S. Provisional Patent Application No. 62/095,422, filed on Dec. 22, 2014, the entire contents of which is incorporated herein by reference.

The following description is intended to convey a thorough understanding of the embodiments described by providing a number of specific example embodiments and details involving a multi-feed scanner that utilizes a mobile-based remote data capture device. It should be appreciated, however, that the present disclosure is not limited to these specific embodiments and details, which are examples only. It is further understood that one possessing ordinary skill in the art, in light of known systems and methods, would appreciate the use of the invention for its intended purposes and benefits in any number of alternative embodiments, depending on specific design and other needs. As used herein, the term "mobile device" may include a smartphone, a PDA, a tablet computer, a cellphone, wearable mobile devices which may include smart watches, or other mobile communications device. The mobile device may include a camera and a mobile banking application.

Figure 1A:
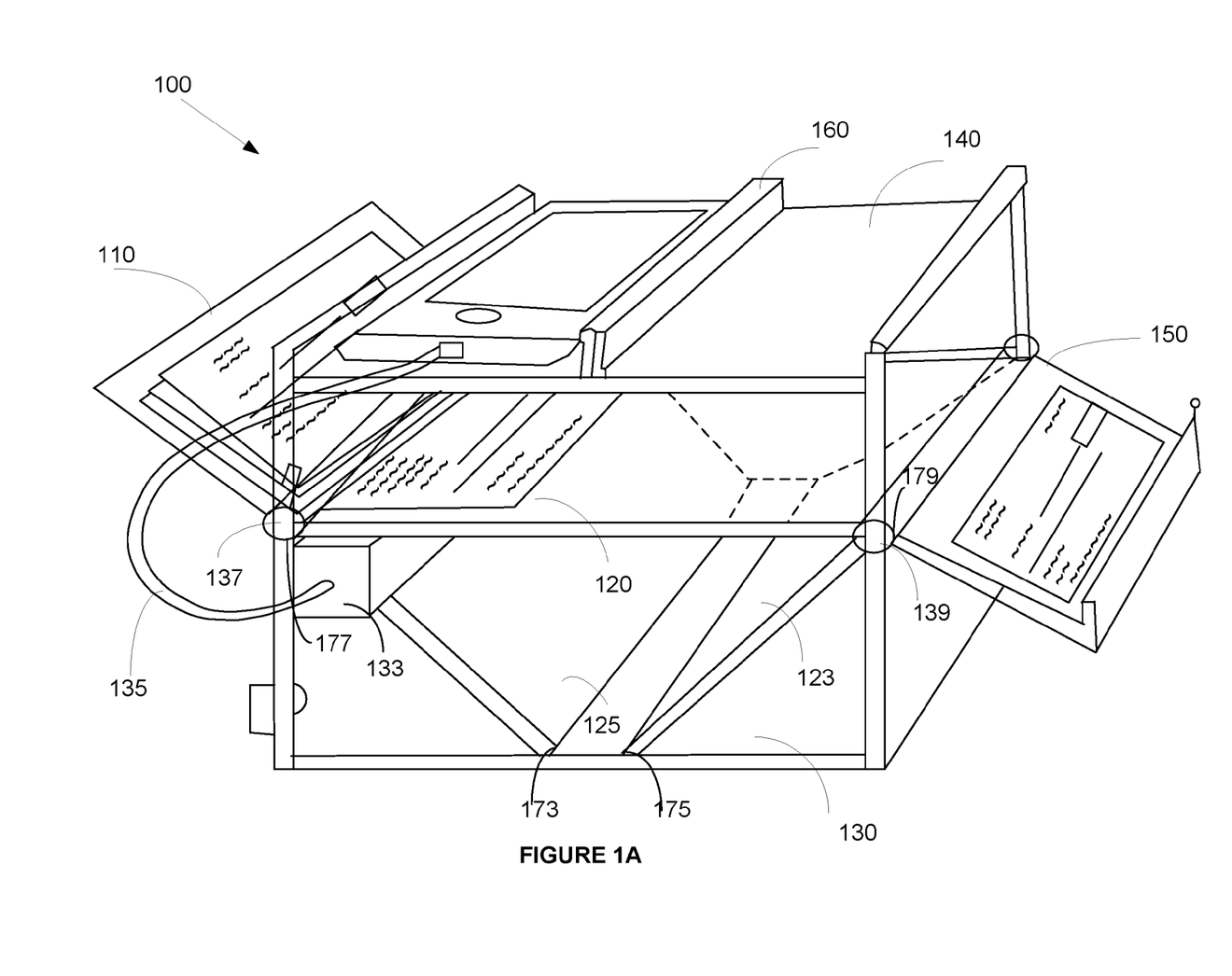
FIGS. 1A-1B depict a multi-feed scanner that utilizes a mobile-based remote data capture device, according to an example embodiment of the disclosure.
Figure 1B:
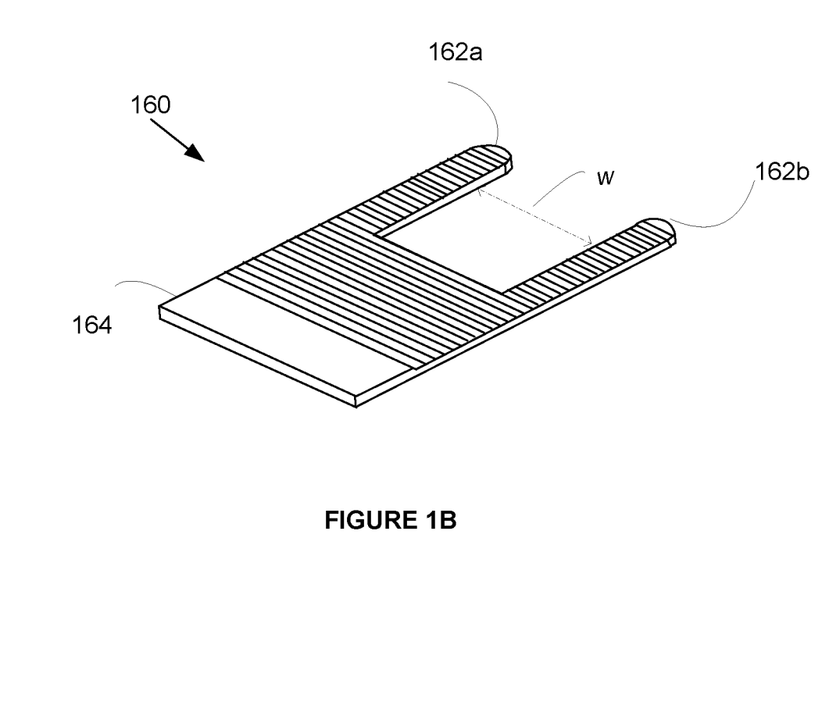

FIGS. 1A-1B depict an example embodiment of a mobile device multi-feed scanner 100. As shown in FIG. 1A, an imaging device, which may be mobile device multi-feed scanner 100 may include a platform 120, a base 130, an imaging tray 140, and a frame 170. In various embodiments, one or more components of mobile device multi-feed scanner 100 may be made of plastic and/or metal and/or any other suitable material to bear the weight of, for example, the mobile device and maintain structural integrity. As shown in FIG. 1A, the base 130 may include a flat, rectangular-shaped piece which supports a frame 170, a first mirror 123, a second mirror 125, and other components of multi-feed scanner 100. Frame 170 may be made of a plastic material, may project vertically from the four corners of base 130 and may support platform 120, imaging tray 140, and motor 133.

Platform 120 and imaging tray 140 may extend in a plane parallel to the plane for base 130. Platform 120 may have an upper side substantially orthogonal to the imaging tray and a reverse side opposite of the upper side. Platform 120 and imaging tray 140 may include a flat rectangular-shaped piece. Mirror 125 may project from connection portion 173 at an acute angle relative to base 130, and mirror 123 may project from connection portion 175 at an acute angle relative to the base 130. The acute angle may include 45 degrees relative to base 130. Imaging tray 140 may include a transparent surface, such as formed from glass. Platform 120 may include a transparent surface, such as formed from glass, or may include a transparent portion.

Imaging device 100 may include an object transport system, which may include roller 137 and roller 139, which may run parallel along the vertical edges of platform 120. Roller 137 and roller 139 may be utilized for feeding an object to platform 120. An object transport system may include a belt along which an object can be moved on and off of platform 120. Mirrors 125 and 123 may allow the reflection of the back of a check to be viewed by a camera located adjacent to the device tray 140 through platform 120.

A feeder 110 may connect to platform 120 and frame 170 at connection point 177. A capture tray 150 may connect to platform 120 and frame 170 at connection point 179. Feeder 110 may include markings and/or an outline on its face showing where a check or other document should be placed by a user. The markings may be dimensioned to the size of a standard bank check. Although the disclosure uses a check as the document to be imaged, the invention applies to all types of documents to be imaged and/or scanned.

Feeder 110 may include an extension piece (not shown) which may be removeably attachable to one end of feeder 110. If a user wishes to place a larger check (or a larger document) that is too big for feeder 110, the user may attach an extension piece to the end of feeder 110. Similarly, capture tray 150 may include an extension piece (not shown) which may be removeably attachable to one end of capture tray 150. If a user wishes to scan a larger check (or a larger document) that is too big for capture tray 150, the user may attach an extension piece to the end of capture tray 150. Feeder 110 and capture tray 150 may also include may include raised "rails" that run parallel to the length of feeder 110 and capture tray 150 respectively, and are separated by a distance equal to the width of a standard check.

Imaging tray 140 may include cradle 160, which may be a planar component. As shown in FIG. 1B, cradle 160 may include prongs 162a and 162b which project from one end of cradle 160. Cradle 160 may include a backstop 164 at the opposite end. Backstop 164 may be a projection that is slightly raised from the top surface of cradle 160. In various embodiments, the top surface of cradle 160 may include gripping material (e.g., a rubberized material). In various embodiments, the length of prongs 162a and 162b may be adjustable (e.g., using a telescopic arrangement). In various embodiments, the prongs 162a and 162b may project from slots in end of cradle 160 (opposite the backstop 164). The prongs 162a and 162b may slide in the slots and in this way the portions of prongs 162a and 162b that project from cradle 160 may be adjustable to accommodate larger mobile devices.

Prongs 162a and 162b may be separated by width w. The width w between prongs 162a and 162b may be adjustable depending on the location of the camera on the mobile device and/or the size of the mobile device.

Motor 133, which may include a conveyor motor may control movement of a conveyor mechanism, which may include mechanized rollers 137 and 139 and platform 120. Motor 133 may include discrete settings to control the conveyor mechanism to feed a check from the check feeder onto platform 120 utilizing roller 137, and carry a check off of platform 120 and onto capture tray 150 utilizing roller 139. Motor 133 may include an internal circuit board that controls the motion of the motor. Motor 133 may include firmware and/or software and a wireless connection (e.g. NFC, Bluetooth Low Energy (BLE)), for example, that allows a mobile device to connect to motor 130 and control movement of the conveyor mechanism. For example, an application executing on a mobile device may allow the mobile device to connect to the motor via NFC and/or Bluetooth and include remote controls to control the movement of the rollers. In various embodiments, the motor could receive commands from the remote control and move the rollers accordingly.

The detection by a sensor on feeder 110 or platform 120, which may detect the presence of a check, such as, but not limited to, by detecting the weight of the check or detecting the presence of a check through interruption of a visual path or light sensor, may trigger movement of rollers 137 and 139 to move the check from feeder 110 and onto platform 120, along platform 120 and from platform 120 to capture tray 150, accordingly. Motor 133 may also use a time-based trigger to move the rollers at set time intervals. An object sensor for detecting when an object is on platform 120 may signal an imaging device to take a picture of the object.

A mobile device may also be connected to motor 133 via a connector 135, which may include a cable. An auxiliary cable which connects a mobile device to motor 133 may be connected to the mobile device via a headphone jack on the mobile device.

Motor 133 may be powered by an internal power source. Motor 133 may also receive power from the internal power source of the mobile device when motor 133 is connected to the mobile device via connector 135. Motor 133 may also receive power via a connection to an external AC power source.

In operation, a user may place an object, which may be a stack of checks (or documents) on feeder 110. The user may then place a mobile device on imaging tray 140 above platform 120, which may include placing a mobile device on cradle 160 so that the camera on the mobile device is pointed towards the check and sits in the space between prongs 162a and 162b. Prongs 162a and 162b and/or cradle 160 may include grooves or raised projections that define where the mobile device should be placed on the cradle. The gripping material on the top surface of cradle 160 may keep the mobile device from sliding. The end of the device opposite the camera may be abutted against the backstop 164.

A mobile device placed on imaging tray 140 may be used as a copier and/or scanner for checks and/or documents placed on the platform 120. In various embodiments, mobile device multi-feed scanner 100 may include one or more lights on the underside of cradle 160. The lights may include one or more light detection sensors. If the light sensors detect that the ambient light is too low, the lights may be automatically activated to illuminate the check on platform 120. In various embodiments, backstop 164 may include a recharger that plugs into one end of the mobile device when the device is placed on cradle 160. In various embodiments, cradle 160 may have one or more cameras built into the bottom of cradle 160, facing platform 120. The one or more cameras may be connected to a Blue-tooth enabled device on mobile device multi-feed scanner 100 which may transmit photos to a mobile device, thus eliminating the need for placing the mobile device on the cradle 160.

The conveyor mechanism may roll a check from the stack of checks, one check at a time utilizing a mechanized feeder, from feeder 110 onto platform 120 utilizing roller 137. The check may be rolled onto the left portion of platform 120. Mirrors 125 and 123 angled under the transparent surface of platform 120 may allow the reflection of the back side of the check through the right portion of platform 120. As such, mirrors 125 and 123 may form a reflective path which allows viewing of the reverse side of the object placed on the platform through the transparent portion of the platform. The transparent portion of the platform may be adjacent to a stage portion of the platform. As such, mirrors 125 and 123 may allow imaging of the reverse side of an object through the transparent portion of the platform, while the object rests on the stage portion.

A camera on the mobile device may capture a picture of the left and right portions of platform 120 corresponding to the front and back of the check, respectively. The conveyor mechanism may utilize roller 139 to carry the captured check off platform 120 into capture tray 150. The conveyor mechanism may roll the next check from the stack of checks onto platform 120 and may repeat the above operations until images of all of the checks have been captured.

Platform 120 may include a lens positioned such that the apparent focal distance between the reverse side of the object and the imaging tray is substantially the same as the apparent focal distance between the upper side of the platform and the imaging tray. If the focal distances are not substantially the same, and where individual images of each side are taken, the imaging device may auto focus to correct the distance for each image capture. In another embodiment, the transparent portion of the platform and the first and second mirrors may allow the upper and reverse sides of the object placed on the platform to be simultaneously imaged by an imaging device located adjacent to the imaging tray. When the upper and reverse sides are simultaneously imaged, the imaging device may include a camera with a very narrow aperture lens to keep both sides in focus, or may utilize the transparent portion of the platform as a lens to correct the focal distance.

A mobile device may include for example, an input/output device and a mobile application. An input/output device may include, for example, a NFC and/or Bluetooth™ device or chipset with a NFC and/or Bluetooth™ transceiver, a chip, and an antenna. The transceiver may transmit and receive information via the antenna and an interface. Device control functionality may include connection creation, frequency-hopping sequence selection and timing, power control, security control, polling, packet processing, amplification and the like.

The device control functionality and other NFC and/or Bluetooth™-related functionality may be supported using a NFC and/or Bluetooth™ API provided by the operating system associated with the mobile device (such as, but not limited to, the Android™ operating system, the Apple™ iOS operating system, etc.). For example, using a Bluetooth™ API, an application stored on a mobile device 120 (e.g., a banking application, a financial account application, etc., a remote data capture application) or the device may be able to scan for other Bluetooth™ devices, query the local Bluetooth™ adapter for paired Bluetooth™ devices, establish radio frequency communication (RFCOMM) channels, which include a set of transport protocols, which may include serial port emulation, connect to other devices through service discovery, transfer data to and from other devices, and manage multiple connections. A Bluetooth™ API used in the methods, systems, and devices described herein may include an API for Bluetooth™ Low Energy (BLE™) to provide significantly lower power consumption and allow a mobile device to communicate with BLE™ devices that have low power requirements.

A remote data capture application on the mobile device may be used to take a picture of the left and right portions of platform 120 corresponding to the front and back of the check, respectively. The remote data capture application may automatically take the picture, and may continue to take pictures so that the images may be processed in a loop. For example, the remote data capture application may detect that the entire check is in view, and in response, may take a picture. The remote data capture application may be configured to separate the image of the combined left and right portions of platform 120 corresponding to the front and back of the check, respectively, into individual images of the front and back of the check.

The remote data capture application may communicate with mobile device multi-feed scanner 100 via a wired or a wireless connection. For example, for wired communications, an auxiliary cable connected to a mobile device may connect the mobile device to the multi-feed scanner. The auxiliary cable may be connected to the mobile device via a headphone jack. Based on detection by a sensor on platform 120 of the location of the image of the front and back of the check on platform 120, the headphone jack connection may trigger the camera on the mobile device to take a picture. Alternately, remote data capture application may communicate with mobile device multi-feed scanner 100 via a Bluetooth connection. As such, upon detection by a sensor on platform 120 of the location of the image of the front and back of the check on platform 120, the remote data capture application may receive this detection and may communicate with the mobile device to trigger the camera to take a picture. The detection by a sensor may detect the presence of a check by detecting the weight of the check, or interruption of a visual path such as through implementation of a light sensor.

Figure 2A:
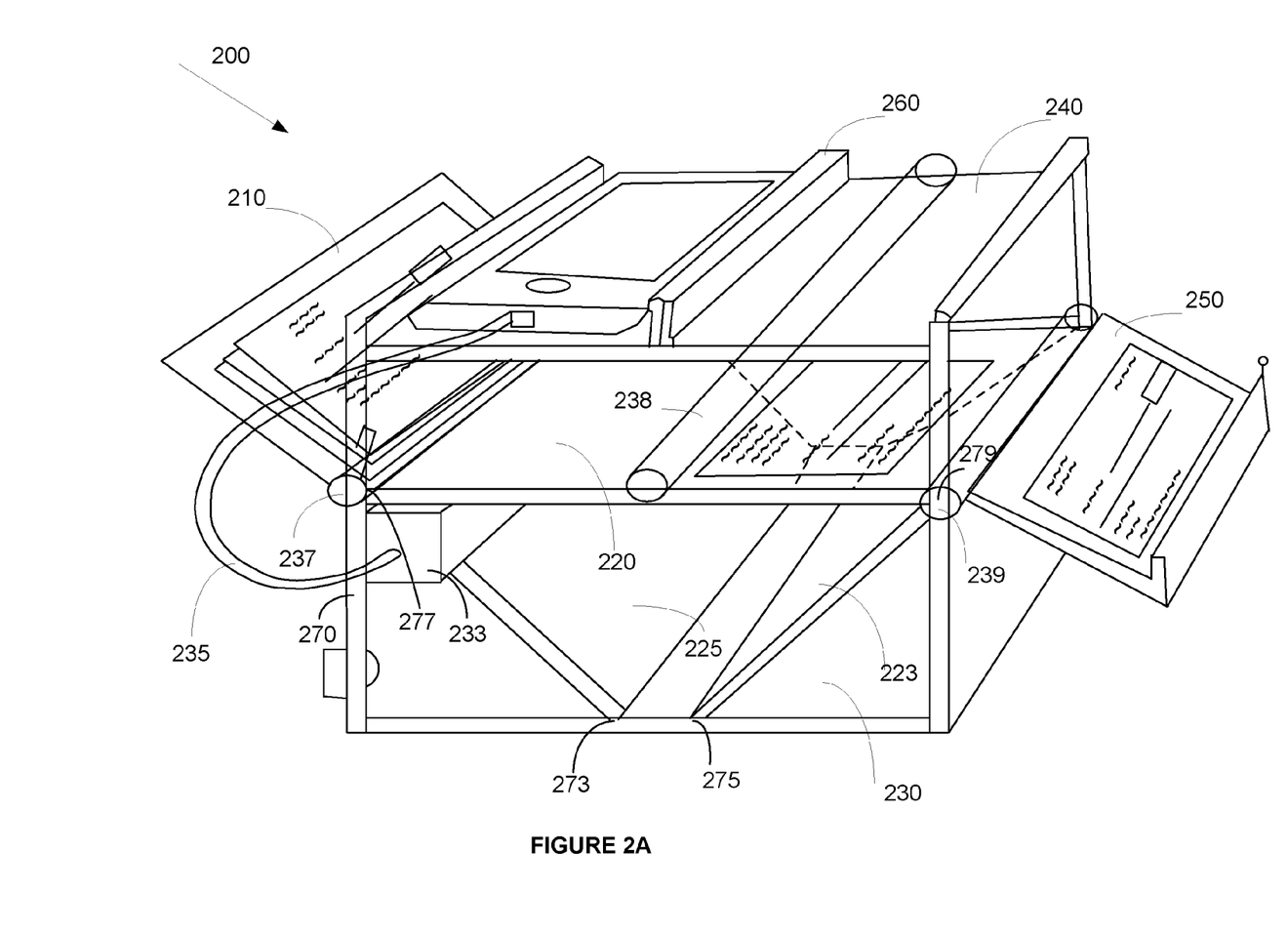
FIG. 2A-2B depict a multi-feed scanner that utilizes a mobile-based remote data capture device, according to an example embodiment of the disclosure.

FIG. 2A depicts an embodiment of with mobile device multi-feed scanner 200. Mobile device multi-feed scanner 200 may include similar components as multi-feed scanner 100. As shown in FIG. 2A, mobile device multi-feed scanner 200 may include a platform 220, a base 230, an imaging tray 240, and a frame 270. As shown in FIG. 2A, the base 230 may include a flat, rectangular-shaped piece which supports a motor 233, a frame 270, mirror 223, mirror 225, and other components of multi-feed scanner 200. Frame 270 may be made of a plastic material, may project vertically from the four corners of base 230 and may support platform 220 and imaging tray 240. In the embodiment shown in FIG. 2A, platform 220 and imaging tray 240 may extend in a plane parallel to the plane for base 230. Platform 220 and imaging tray 240 may include a flat rectangular-shaped piece. Mirror 225 may project from connection portion 273 at an acute angle relative to base 230, and mirror 223 may project from connection portion 275 at an acute angle relative to the base 230. Platform 220 may include a transparent surface, which may include glass. Roller 237, roller 238, and roller 239 may run parallel along the vertical edges of platform 220. Mirrors 225 and 223 may allow viewing of the reflection of the back of a check through platform 220.

A feeder 210 may connect to platform 220 and frame 270 at connection point 277. A capture tray may connect to platform 220 and frame 270 at connection point 279. Imaging tray 240 may include cradle 260, which may be a planar component. Motor 233, which may include a conveyor motor may control movement of a conveyor mechanism, which may include mechanized rollers 237, 238, and 239 and platform 220. Motor 233 may include discrete settings to control the conveyor mechanism to feed a check from the check feeder onto platform 220 utilizing roller 237, and carry a check off of platform 220 and onto capture tray 250 utilizing roller 239. Motor 233 may include firmware and/or software and a wireless connection (e.g. Bluetooth Low Energy (BLE)), for example, that allows a mobile device to connect to motor 230 and control movement of the conveyor mechanism. For example, an application executing on a mobile device may allow the mobile device to connect to the motor via Bluetooth and include remote controls to control the movement of the rollers. In various embodiments, the motor could receive commands from the remote control and move the rollers accordingly. A mobile device may also be connected to motor 233 via a connector 235, which may include a cable.

Figure 2B:
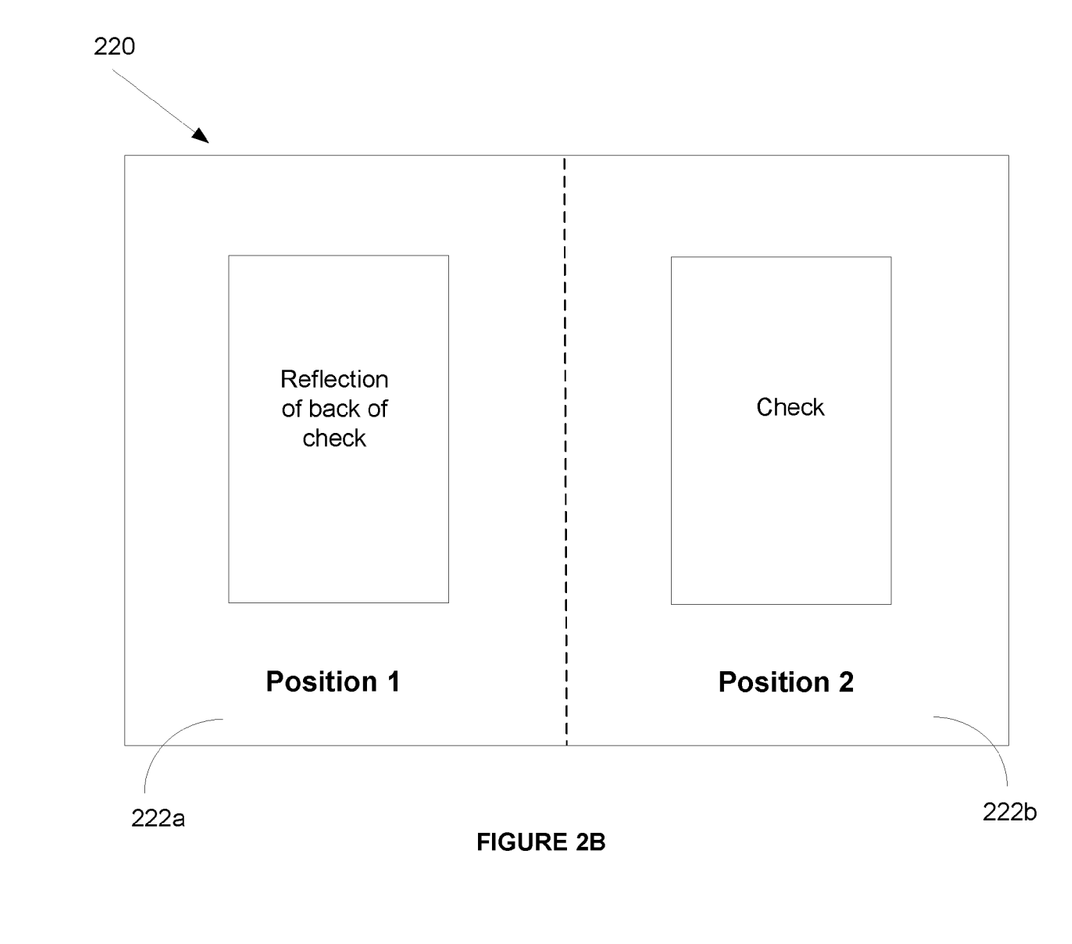

In operation, a user may place an object, which may be a stack of checks (or documents) on feeder 210. The user may then place a mobile device on imaging tray 240 above platform 220, which may include placing a mobile device on cradle 260 so that the camera on the mobile device is pointed towards the check. An object transport system which may include a conveyor mechanism may roll a check from the stack of checks, one check at a time utilizing a mechanized feeder, from feeder 210 onto platform 220 utilizing roller 237. The check may be rolled onto the left portion of the transparent surface of platform 220 (position one). A camera on the mobile device may capture a picture of this left portion of the transparent surface of platform 220 which is displaying the front side of the check. The conveyor mechanism may then roll the check from position one to position two of platform 220, utilizing roller 238. With the check in position two, as illustrated in FIG. 2B which shows a top-down view of platform 220, mirrors 225 and 223 angled under the transparent surface of platform 220 may allow viewing of the reflection of the back side of the check through the left portion of platform 220 (position 1). A camera on the mobile device may capture a picture of this left portion of the transparent surface of platform 220 which is displaying the reflection of the back side of the check.

The present disclosure is not to be limited in terms of the particular embodiments described in this application, which are intended as illustrations of various aspects. Many modifications and variations can be made without departing from its spirit and scope, as may be apparent. Functionally equivalent methods and apparatuses within the scope of the disclosure, in addition to those enumerated herein, may be apparent from the foregoing representative descriptions. Such modifications and variations are intended to fall within the scope of the appended representative claims. The present disclosure is to be limited only by the terms of the appended representative claims, along with the full scope of equivalents to which such representative claims are entitled. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It may be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It may be further understood by those within the art that if a specific number of an introduced claim recitation is intended, such an intent may be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It may be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" may be understood to include the possibilities of "A" or "B" or "A and B."

The foregoing description, along with its associated embodiments, has been presented for purposes of illustration only. It is not exhaustive and does not limit the invention to the precise form disclosed. Those skilled in the art may appreciate from the foregoing description that modifications and variations are possible in light of the above teachings or may be acquired from practicing the disclosed embodiments. For example, the steps described need not be performed in the same sequence discussed or with the same degree of separation. Likewise various steps may be omitted, repeated, or combined, as necessary, to achieve the same or similar objectives. Accordingly, the invention is not limited to the above-described embodiments, but instead is defined by the appended claims in light of their full scope of equivalents.

In the preceding specification, various preferred embodiments have been described with references to the accompanying drawings. It may, however, be evident that various modifications and changes may be made thereto, and additional embodiments may be implemented, without departing from the broader scope of the invention as set forth in the claims that follow. The specification and drawings are accordingly to be regarded as an illustrative rather than restrictive sense.

The invention claimed is:

1. An imaging device comprising:
 a motorized check feed stand comprising:
  an imaging tray;

a platform, said platform having an upper side substantially orthogonal to the imaging tray and a reverse side opposite said upper side; and first and second mirrors;

wherein the platform comprises a transparent portion;

wherein the first and second mirrors form a reflective path allowing viewing of a reverse side of an object placed on the platform through the transparent portion of said platform;

wherein said transparent portion of said platform is adjacent a stage portion of said platform, and wherein said first and second mirrors allow imaging of the reverse side of an object through the transparent portion of the platform while said object rests on said stage portion.

2. An imaging device according to claim 1, wherein said imaging tray is configured to receive a mobile device comprising a camera.

3. An imaging device according to claim 1, wherein said transparent portion of said platform comprises a lens such that the apparent focal distance between the reverse side of an object and the imaging tray is substantially the same as the apparent focal distance between the upper side of said platform and said imaging tray.

4. An imaging device in accordance with claim 3, wherein said transparent portion of said platform and said first and second mirrors allow the upper and reverse sides of an object placed on the platform to be simultaneously imaged by an imaging device located adjacent said imaging tray.

5. An imaging device in accordance with claim 4, further comprising an object transport system, said object transport system comprising a first roller for feeding an object to said platform.

6. An imaging device in accordance with claim 4, further comprising an object transport system, said object transport system comprising a belt along which an object can be moved onto and off of the platform.

7. An imaging device in accordance with claim 6, further comprising an object sensor for detecting when an object is on said platform, and signaling an imaging device to take a picture of the object.

8. A method for capturing an image of an object comprising:

placing an object on a platform of a stand, wherein the platform has an upper side substantially orthogonal to an imaging tray and a reverse side opposite said upper side;

placing a mobile device having a camera on the imaging tray of the stand;

activating an application on the mobile device, connected to the stand via Bluetooth and/or NFC technologies, to capture an image of a front side and a reverse side of the object;

wherein a first and second mirrors form a reflective path allowing viewing of the reverse side of the object placed on the platform through a transparent portion of the platform;

wherein said transparent portion of said platform is adjacent a stage portion of said platform, and wherein said first and second mirrors allow imaging of the reverse side of an object through the transparent portion of the platform while said object rests on said stage portion.

9. The method of claim 8, wherein said imaging tray is configured to receive a mobile device comprising a camera.

10. The method of claim 8, wherein said transparent portion of said platform comprises a lens such that the apparent focal distance between the reverse side of an object and the imaging tray is substantially the same as the apparent focal distance between the upper side of said platform and said imaging tray.

11. The method of claim 10, wherein said transparent portion of said platform and said first and second mirrors allow the upper and reverse sides of an object placed on the platform to be simultaneously imaged by an imaging device located adjacent said imaging tray.

12. The method of claim 11, further comprising feeding an object to said platform via and object transport system.

13. The method of claim 12, wherein said object transport system comprises a belt along which an object can be moved onto and off of the platform.

14. The method of claim 8, further comprising detecting when an object is on said platform via an object sensor and signaling an imaging device to take a picture of the object.

* * * * *